US012578286B2

(12) United States Patent
Liu et al.

(10) Patent No.: US 12,578,286 B2
(45) Date of Patent: Mar. 17, 2026

(54) MULTICHANNEL LED LIGHT TO ENABLE PHOTOMETRIC STEREO FOR 3D RECONSTRUCTION

(71) Applicant: UnitX, Inc., Santa Clara, CA (US)

(72) Inventors: Tommy Liu, Santa Clara, CA (US); Killian Weber, Santa Clara, CA (US); Roman Balak, San Jose, CA (US); Hill Ma, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 266 days.

(21) Appl. No.: 18/369,003

(22) Filed: Sep. 15, 2023

(65) Prior Publication Data

US 2025/0093280 A1 Mar. 20, 2025

(51) Int. Cl.
*G01N 21/95* (2006.01)
*G01N 21/88* (2006.01)
*G06T 7/00* (2017.01)
*G06T 7/593* (2017.01)

(52) U.S. Cl.
CPC ..... *G01N 21/9515* (2013.01); *G01N 21/8806* (2013.01); *G01N 21/8851* (2013.01); *G06T 7/0004* (2013.01); *G06T 7/593* (2017.01); *G01N 2021/8867* (2013.01); *G01N 2021/8887* (2013.01); *G06T 2207/20081* (2013.01); *G06T 2207/20084* (2013.01)

(58) Field of Classification Search
CPC ........... G01N 21/9515; G01N 21/8806; G01N 21/8851; G01N 2021/8867; G01N 2021/8887; G06T 2207/20081; G06T 2207/20084; G06T 7/593
See application file for complete search history.

(56) References Cited

U.S. PATENT DOCUMENTS

| | | | |
|---|---|---|---|
| 2014/0376003 A1 | 12/2014 | Keranen et al. | |
| 2016/0320265 A1* | 11/2016 | Tyre ................... | G01M 17/027 |
| 2017/0124715 A1 | 5/2017 | Tin | |
| 2020/0265575 A1* | 8/2020 | Oota ....................... | G11C 5/08 |

FOREIGN PATENT DOCUMENTS

| | | | |
|---|---|---|---|
| KR | 20200014532 | 2/2020 | |
| KR | 20200014532 A * | 2/2020 | ......... G01N 21/8806 |

OTHER PUBLICATIONS

"International Application Serial No. PCT US2024 046831, International Search Report mailed Dec. 20, 2024", 3 pgs.
"International Application Serial No. PCT US2024 046831, Written Opinion mailed Dec. 20, 2024", 7 pgs.

* cited by examiner

*Primary Examiner* — Georgia Y Epps
*Assistant Examiner* — Don J Williams
(74) *Attorney, Agent, or Firm* — Schwegman Lundberg & Woessner, P.A.

(57) ABSTRACT

In an example, a light system is provided that allows for increased reliability in directly detecting defects in components by capturing multiple different images of the component under different lighting conditions and using a photometric stereo technique to reconstruct a three-dimensional (3D) model of the component, which can be used to perform additional operations to increase the reliability of defect detection, such as measuring the height of variations in a surface of the component.

20 Claims, 8 Drawing Sheets

ACCESS SEQUENCE *602*

WRITE SEQUENCE IN MEMORY *604*

CAPTURE PLURALITY OF IMAGES *606*

PERFORM PHOTOMETRIC STEREO ON PLURALITY OF IMAGES *608*

MEASURE CHANGE IN DEPTH OF A FEATURE ON SURFACE *610*

USE CHANGE IN DEPTH TO DETERMINE WHETHER FEATURE IS A DEFECT *612*

MULTICHANNEL LED LIGHT TO ENABLE PHOTOMETRIC STEREO FOR 3D RECONSTRUCTION

TECHNICAL FIELD

This application relates generally to inspection cameras. More particularly, this application relates to using multichannel LED light to enable photometric stereo for 3D reconstruction.

BACKGROUND

Inspection cameras are used in industrial products to aid in detecting defects in manufactured products. For example, if a manufacturer is producing metal castings, one or more inspection cameras may be placed in a manufacturing and/or assembly line to inspect the produced metal castings, or portions thereof, to detect any issues with quality control. However, when capturing images, a particular light source may not be conducive for imaging a product having a particular surface, a particular defect, and/or a particular environment. For example, surface materials or characteristics on products that affect light quality of a captured image include reflective qualities, transparent qualities, or black/opaque qualities. In another example, some types of defects may be difficult to detect, such as scratches or dirt. In another example, some environments are more challenging to detect product defects in.

BRIEF DESCRIPTION OF DRAWINGS

FIGS. 3 and 4 are screen captures depicting a user interface.

DETAILED DESCRIPTION

An inspection camera may be improved by improving the design of a lighting apparatus to increase light in various scenarios. More particularly, rather than a single light source, which provides inadequate light for capturing an image with quality sufficient to ascertain the existence of surface defects on all surface materials on various components or products, a lighting apparatus having multiple light sources may be provided. Furthermore, a controller for the lighting apparatus may be provided that allows for the multiple light sources to be independently controlled, allowing for lighting combinations and sequences to be utilized to maximize the flexibility of the lighting apparatus to provide sufficient light for a number of different products, components, materials, and environments.

In addition to this light system providing the opportunity for increased reliability in directly detecting defects in components (e.g., by capturing an image of the component under ideal lighting conditions), in an example embodiment the light system is used to capture multiple different images of the component under different lighting conditions and use a photometric stereo technique to reconstruct a three-dimensional (3D) model of the component, which can be used to perform additional operations to increase the reliability of defect detection, such as measuring the height of variations in a surface of the component.

In an example embodiment, a controller and computer system are provided for a lighting apparatus that can be used for 3D reconstruction of a component. More particularly, users are able to use the computer system to define a sequence of one or more capture configurations. Each capture configuration includes identification(s) of one or more light sources to illuminate during an image capture, one or more channels to use to capture the image, and an exposure time. Each sequence can further define custom delays between capture configurations within the sequence.

Upon receipt of a trigger from either hardware or software, the controller then fires the stored sequence, which triggers the camera to take images based on the captured configurations (and delays).

The description that follows includes illustrative systems, methods, techniques, instruction sequences, and computing machine program products that have illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
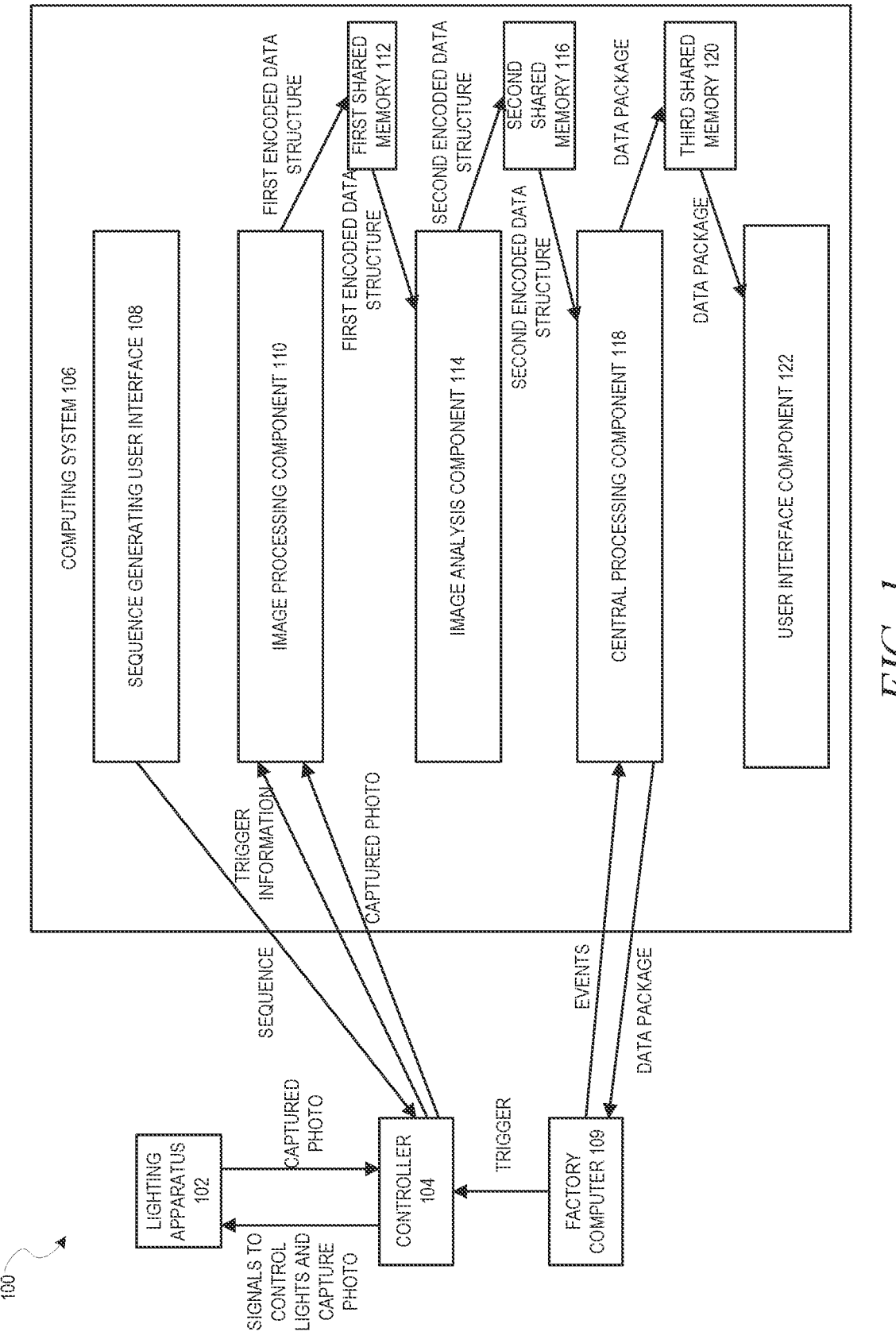
FIG. 1 is a block diagram illustrating an inspection camera system, in accordance with an example embodiment.
Figures 2A, 2B, 2C, 2D, 2E, 2F, 2G, 2H:
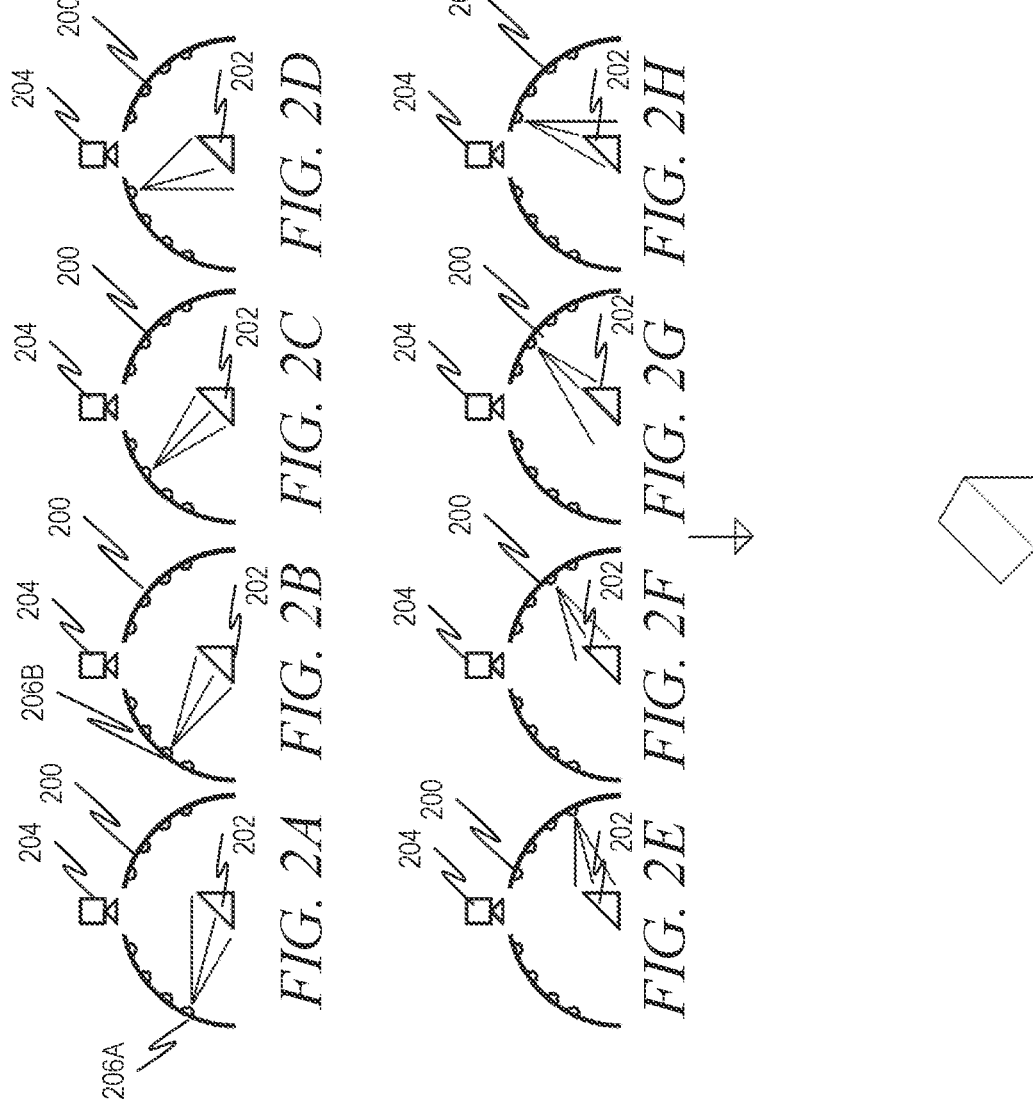
FIGS. 2A-2H are diagrams illustrating a photometric stereo technique using a light dome, in accordance with an example embodiment.

FIG. 1 is a block diagram illustrating an inspection camera system 100, in accordance with an example embodiment. The inspection camera system 100 may include a lighting apparatus 102, a controller 104, and a computing system 106. The lighting apparatus 102 includes a plurality of different lights, such as Light Emitting Diode (LED) lights that are separately controllable by the controller 104. This means that the lights can be turned on and off independently of one another, allowing the lighting apparatus 102 to have some, but not all, of its lights on at any given time. In some example embodiments, the brightness of each of the lights can also be independently controlled, so that a light can have a custom level of brightness/dimness in addition to merely being on or off.

Furthermore, for photometric stereo, it may be advantageous to have a (different) single light source used for each of a plurality of images captured of a component. As such, rather than having multiple LED lights on in each image, only a single LED light may be illuminated for each image, at least for the images intended to be used for photometric stereo for 3D reconstruction (different lighting scenarios may be used for images to be used for direct defect detection).

The lighting apparatus 102 further may include one or more cameras. Each of these cameras can also be independently controlled to take pictures/capture images when signaled. Variables can also be independently controlled. These variables may include any software-definable parameters of the imaging system including, but not limited to, aperture and/or focus of the lens, exposure time of the camera, phase and/or pattern of the diffuser, wavelength and/or intensity of the light, and so on.

In an example embodiment, the lighting apparatus 102 is a light dome. The light dome in use illuminates a target object, such as a metal casting or other product. The light dome includes a housing containing a number of light sources as will be described in more detail below. In some examples, the light sources comprise a plurality of LEDs or display screens arranged to provide flexibility in illuminating the target object.

The one or more cameras, which may be mounted to the light dome by a bracket, captures images of the illuminated target object through a hole in the top of the light dome.

The controller 104 is an electronic component that is designed to send signals to the lighting apparatus 102 via one or more channels to control the lights on the lighting apparatus 102.

The computing system 106 includes a variety of different software components, running on a computing hardware platform. These components include a sequence generating user interface 108. The sequence generating user interface 108 allows a user to create a sequence as an ordered combination of capture configurations, optionally separated by customized delays. The created sequence may then be stored on the controller 104, such as in a memory component in the controller 104. Upon receipt of an external trigger, the controller 104 then retrieves the sequence and fires the sequence, meaning the capture configurations in the sequence are used to control the lighting apparatus 102 according to the parameters defined in each capture configuration, separated by the custom delays.

The external trigger may be either a hardware trigger (such as from a programmable logic controller) or a software trigger (such as from an industrial personal computer). In some example embodiments, one or more of the triggers may be received from a factory computer 109. Once the trigger occurs, the sequence fires, which controls the lighting apparatus 102 to light the appropriate lights at the appropriate time and also to trigger the camera or cameras to take pictures/capture images at the appropriate times.

The controller 104 sends information about the trigger to an image processing component 110 on the computing system 106. The image processing component 110 also uses the system timestamp at the moment it receives the information about the trigger to record a time for the receipt of the trigger. The controller 104 also receives the photo(s) from the lighting apparatus 102, timestamps them, and sends the timestamped images to the image processing component 110. The image processing component 110 then encodes a data package, which includes photo(s), capture configuration information, timestamps, camera identifications, and other information, in a data structure or data structures, which is/are then stored in first shared memory 112.

An image analysis component 114 then retrieves this data structure and decodes it. It then can perform one or more analysis tasks on the image. In the case of images being used for 3D reconstruction, a photometric stereo technique, which will be described later, is used on multiple images captured having different single light sources.

The image analysis component 114 then encodes the results of these image analysis tasks into another data structure. This data structure may include, for example, a 3D reconstruction on the component. This data structure is then stored in a second shared memory 116.

A central processing component 118 then retrieves the data structure from the second shared memory 116 and performs timestamp sorting on the data in the data structure, using information obtained from the programmable logic controller, such as part identification, inspection identification, inspection ready, part start, part end, etc. It then packages the sorted data into a data package that is stored in a third shared memory 120. The data package may include, for example, a part identification, inspection identification, camera identification, image, inference mask, other inference post-processing results, error codes, and the like.

A user interface component 122 then is provided that can access the data package in the third shared memory 120 and display portions of it to a user via a graphical user interface. Here, a user may specify an inspection mode (such as manual or automatic), and can also add customer-specific settings, such as image display settings, how and whether to upload the image into a cloud environment, etc.).

It should be noted that in some example embodiments, the user interface component 122 and the user interface 108 may be combined into a single component. In other words, the sequence-defining capabilities of the user interface 108 may be combined with the output and settings-related capabilities of the user interface component 122.

Photometric stereo assumes that the object's surface follows a Lambertian reflectance, meaning that the amount of light reflected from a surface is determined by its orientation relative to the light source and the camera. The camera remains in a fixed position while the light sources change. For each pixel in the images, the intensities across the different images are analyzed. Due to the changing lighting angles, the intensities vary based on the surface orientation of the object at that pixel. Pixels that appear brighter in some images and darker in others indicate changes in surface orientation and curvature.

By analyzing the intensity variations, a photometric stereo technique estimates the surface normal at each pixel on the object's surface. Surface normal are vectors that point outward from the surface and indicate the direction the surface is facing. The relationship between the surface normal, the light direction, and the camera detection is described by Lambert's law, which governs how light is reflected off of a Lambertian surface. In one example embodiment, finding normal is performed using an L2 method, where the L2 norm is calculated as the square root of the squared vector values, but other techniques may be used.

The estimated surface normals are integrated to reconstruct a three-dimensional representation of the object's shape. The integration process involves accumulating the normal to estimate the surface depth. The integration results in a height map that represents the object's surface geometry relative to some horizontal surface. Thus, each surface may be assigned such a height map, which may essentially be a two-dimensional representation of the height at each point along the surface. In an example embodiment, the height is calculated using a Poisson distribution.

This height map may then be filtered using the uniform filtering technique described earlier, to reduce global inaccuracies.

FIGS. 2A-2H are diagrams illustrating a photometric stereo technique using a light dome 200, in accordance with an example embodiment. Each of FIG. 2A-2H depict the light dome 200 at different times, when different light sources within the light dome 200 are illuminated. A component 202 is placed in the center of the light dome 200. Here the component 202 is a wedge-shaped component. A camera 204 in the top of the light dome 200 takes an image of the component 202 under the various different lighting conditions caused by illuminating the different light sources of the light dome 200. Thus, for example, in FIG. 2A, light source 206A is illuminated while the other light sources are not. Likewise, in FIG. 2B, light source 206B is illuminated while the other light sources are not.

While not pictured in FIGS. 2A-2H, the component 202 may have one or more defects in it that would be useful to detect. 3D reconstruction of the component 202 may be performed using photometric stereo based on multiple images of the component 202 taken in succession, each with a different light source. This allows additional characteristics of the component 202 to be measured, such as variations in the height of portions of a surface of the component that may or may not be indicative of a defect. For example, not only can a bump be detected but the relative height of the bump with respect to the rest of the surface can be measured. A similar technique can be used to measure the relative height of a divot in a surface of the component 202.

Figure 3:
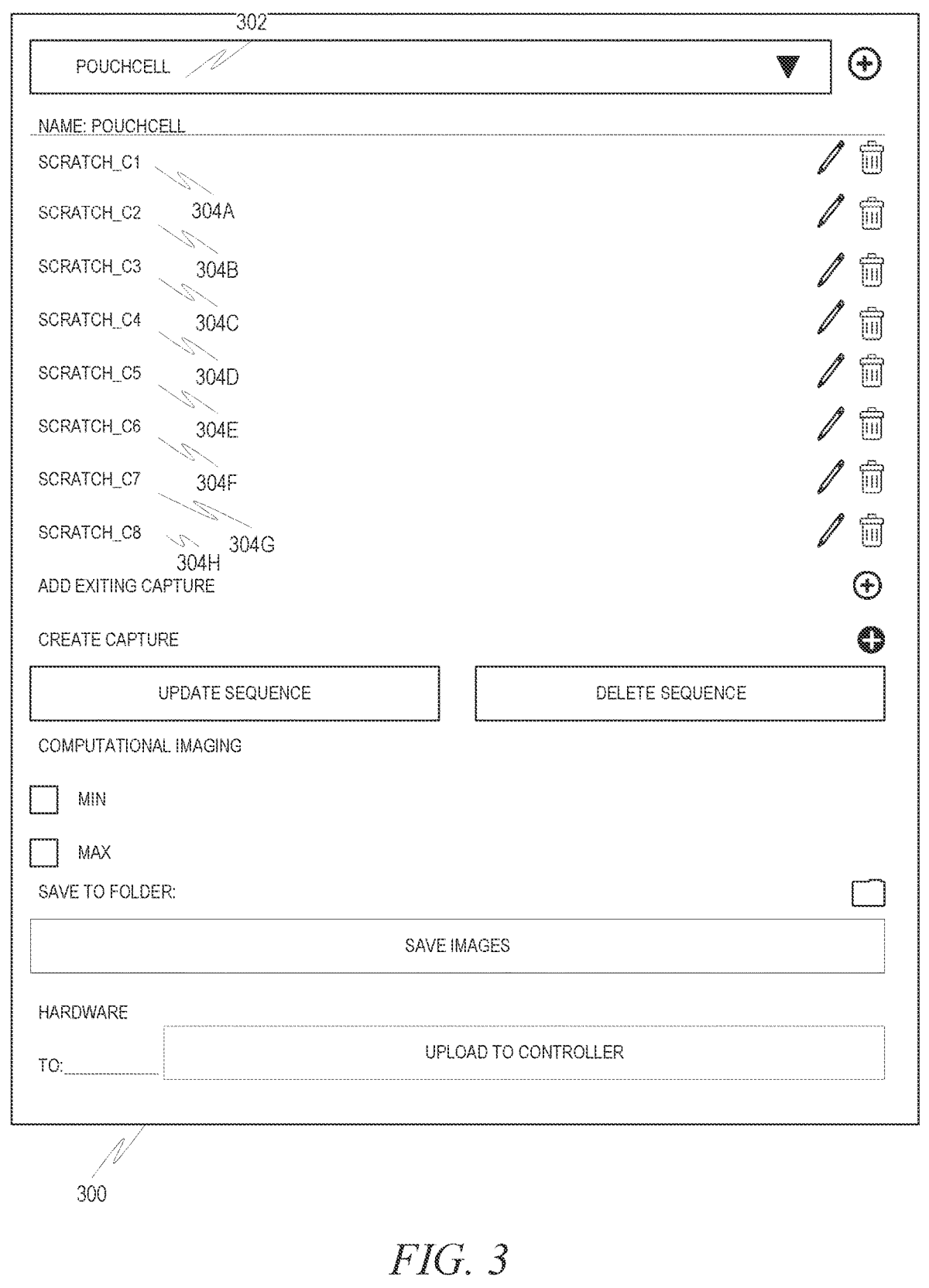
Figure 4:
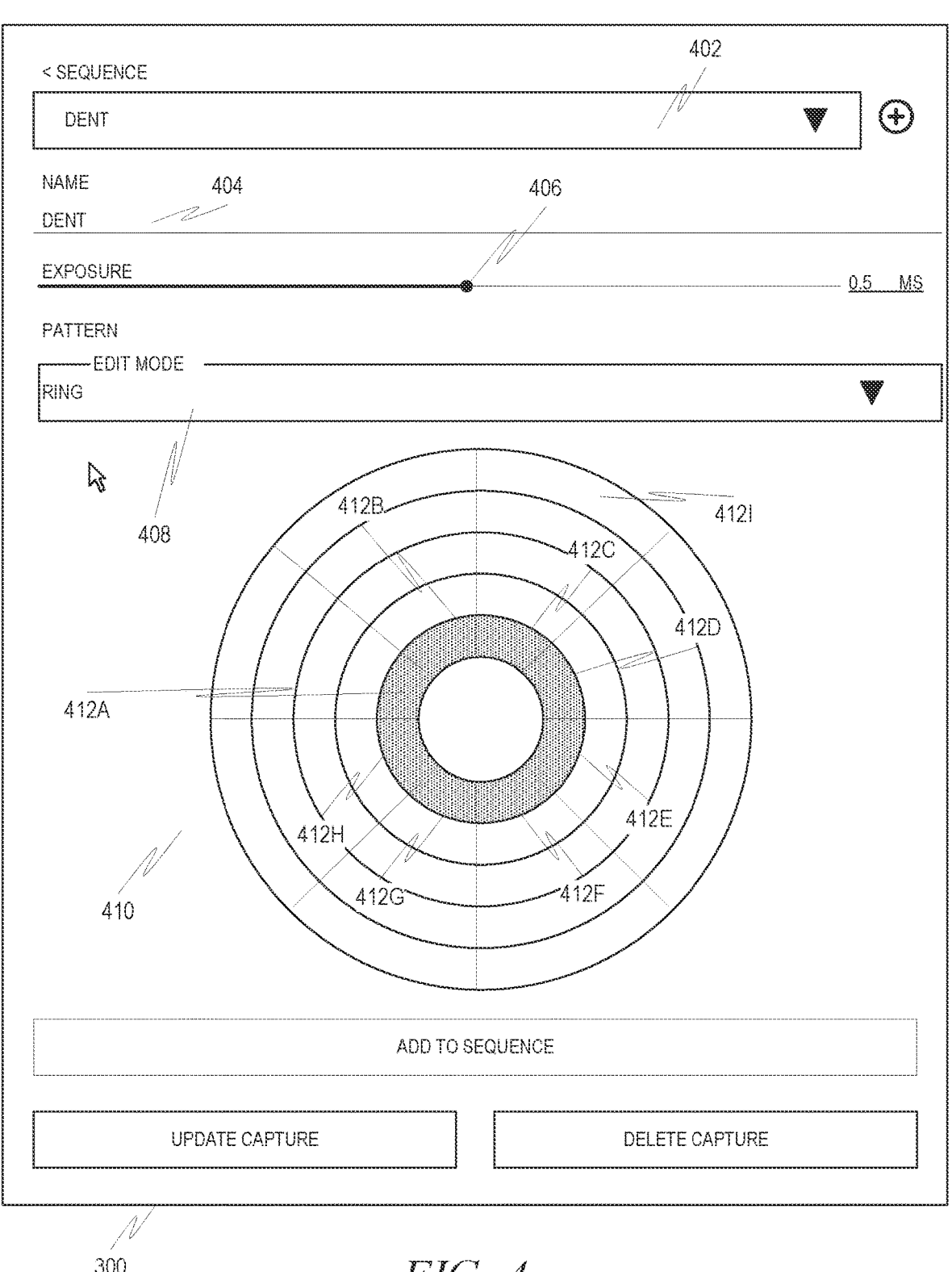

As mentioned earlier, user interface 108 provides a mechanism by which a user can specify capture configurations, including lighting combinations. FIGS. 3 and 4 are screen captures depicting such a mechanism. Specifically, referring first to FIG. 3, user interface 300 displays a screen where a user can name/select a sequence name 302, as well as name/create various capture configurations 304A-304H. While not pictured here, the user can also specify custom delay times between one or more of the capture configurations 304A-304H. Each sequence has a number of capture configurations that are processed in order. Thus, in the example depicted here, capture configuration 304A is fired before capture configuration 304B, and so on.

Referring to FIG. 4, user interface 300 also displays a screen where an individual capture configuration can be modified. Here, the capture configuration can be selected using drop-down 402 and its name is depicted at field 404. An exposure time can be specified using slider 406. The drop-down 408 selects the edit mode. When ring is selected as the edit mode, on the click of the pattern, an entire ring will be toggled on and off. When a different edit mode is selected, such as single light source, then only a single light source will be toggled on or off upon clicking. Here, the user has selected the pattern "ring", and the ring pattern is depicted in lighting diagram 410, where LEDs 412A-412H are depicted as "lit" while other LEDs, such as LED 412I, are depicted as "not lit".

The user can also select different individual or combinations of LEDs to be "lit" in the capture configuration. The system may default, when in a ring pattern, to select all LEDs around a selected ring when any LED in that ring is selected. Here, there are 5 possible rings, and if any LED in a ring is selected by the user, then all LEDs in that ring are selected. Here, for example, the user may have selected LED 412B to be lit, which selects the entire ring, and thus causes all LEDS 412A-412H within that ring to be selected to be lit. The user can select any combination or number of rings to be lit simultaneously. In the case of photometric stereo, however, the user may be specifying only a single LED in a single ring, with a different single LED specified for each of a plurality of different images.

In an example embodiment, the lights that are chosen to be illuminated for the images being captured for photometric stereo are ones chosen to maximize the even distribution of light across the component with as few overexposed regions and as few underexposed regions as possible.

In an example embodiment, the determination of which lights to turn on for the photometric stereo technique is performed by a human. In other example embodiments, a partial or even completely automated technique may be utilized. The more prior knowledge is available about the component being imaged, the more likely it is that an automated technique can be used. For example, if the component is a part that has known dimensions, including measurements of each surface of a theoretically perfect version of the component, then that can be used as a ground truth for an automated technique to identify the "best" combinations of lighting angles to use for photometric stereo. To continue this example, images of a "test" component (preferably a unit of the component that has been inspected thoroughly and found to have no defects) can be captured using many or even all of the available light sources individually. Thus, for example, if there are 32 different LEDs on a light dome, the training operation may involve capturing 32 different images of the test component, one where a different one of the 32 different LEDs is illuminated. Then, the different groupings of the images can be tested by, for each grouping, performing a 3D reconstruction using photometric stereo, and then using those 3D reconstructions to perform height measurements of some of the known protrusions on the component. The grouping of images that produces the reconstructions whose height measurements are closest to the known dimensions is selected as the combination to use for future 3D reconstructions of different units of that component. Thus, for example, if the test component is known to have a protrusion with a maximum height of 30 mm on one of its surfaces, it may be that the combination of illuminating lights #1, 49, #17, and #30 produces a reconstruction that comes closest when used to measure the height of that protrusion, closer than, say, the combination of illuminating lights #1, #9, #19, and #31. In that case, the system may then automatically determine that for units of that same component, images captured using lights #1, #9, #17, and #30 (independently) should be taken.

Alternatively, reconstructions can be performed on different groupings of lights to try and identify which lights have no impact on the ability to measure height.

Additionally, while not pictured, in some example embodiments, the user interface 300 may add a live camera feed from the corresponding camera. If the user, for example, puts a component in the lighting apparatus 102, then the user is able to see, in real time, how that component is lit based on the changes they are making to the lighting combinations in the user interface 300.

The depth measurement using or during the 3D reconstruction may be performed using a neural network. Images from an image data source may be used to train the neural network by augmenting the training images with one or more labels. This may involve transforming the images to a different format to accept such labels. The labels added may depend on what the neural network is being trained to do, and specifically may correspond to classifications that the neural network is expected to perform. For example, if an image shows an example of a defect in a particular component, it may be labeled as such so that the neural network can learn what a defect in that particular component looks like. This is an example of a positive label. Additionally, if an image shows an example of the component without a defect, it may be labeled as such so that the neural network can learn what a non-defective component looks like. This is an example of a negative label. While these examples are binary (e.g., either positive or negative), in reality the labels may have any number of values depending on the classifications being performed by the neural network.

In an example embodiment, the neural network is a Deep Convolutional Neural Network (DCNN). A DCNN is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample data and labels. It is trained to minimize the discrepancy (or "loss") between the model's output and the desired output.

The DCNN is designed to learn not only to classify images or groupings of images, but also to learn a feature hierarchy by defining a number of layers. The process of inference involves taking a given input, applying a sequence of mathematical functions called layers, and calculating the functions on the input data. Each layer extracts features from the output of a previous layer, and all layers are trained jointly. The layer-based architecture is why it is termed a "deep" convolutional neural network.

Figure 5:
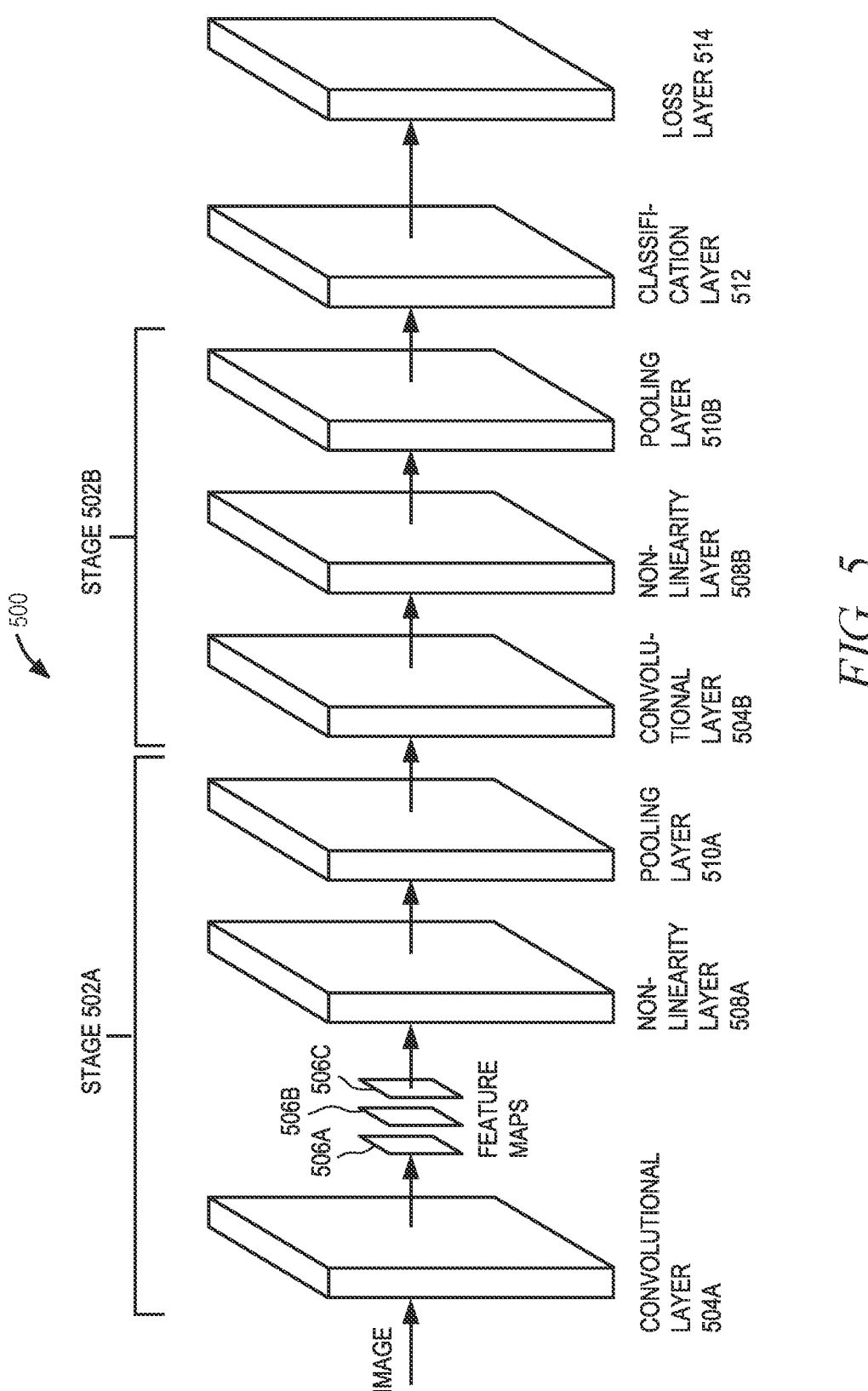
FIG. 5 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN may actually be designed to have any number of these stages. Once the stages are all complete, a loss layer is used. FIG. 5 is a diagram illustrating a DCNN 500, in accordance with an example embodiment. Here, two stages 502A, 502B are depicted.

Convolutional layers 504A, 504B are the core of the DCNN 500. Their parameters include a set of learnable filters that have a small receptive field but extend through the full depth of the input data. During a forward pass in a convolutional layer 504A, 504B, each filter is convolved across the features, computing the dot product between the entries of the filter and the input and producing a two-dimensional activation map of that filter. As a result, the DCNN 500 learns filters that activate when they see some specific type of feature.

The feature maps for all filters can be stacked along the depth dimension to form the full volume output of the convolutional layers 504A, 504B.

The convolutional layers 504A, 504B apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M,k=-N}^{j=M,k=N} x[n, m, o] f_d[n-k, m-j, o]$$

The convolutional layers 504A, 504B will typically have some very small support, e.g., N=1 and M=1, such that g[n, m, d]=0 if |n|>1 or |m|>1.

It should be noted that the filters used in the convolutional layers 504A, 504B may be activated in a first iteration of the DCNN 500 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 504A, 504B are sets of arrays called feature maps 506A-506C. Each feature map 506A-506C may be produced by a different filter and modified based on various functions in each stage. At the output, each feature map 506A-506C represents a particular feature extracted at all locations on the input and conditioned. The example in FIG. 5 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

Nonlinearity layers 508A, 508B give the DCNN 500 greater expressive power in uncovering nonlinear relationships between input and output. Many different nonlinearities could be used in the nonlinearity layer, including sigmoid, tanh, and rectified linear function. For brevity, one example of nonlinearity will be described here: the rectified linear function. This function is defined by the following:

$$y(x) = \begin{cases} x & \text{if } x > 0 \\ 0 & \text{if } x < 0 \end{cases}$$

Pooling layers 510A, 510B are applied to lower the input image's spatial dimensions while preserving some information from the input image. In other words, the pooling layers 510A, 510B do not actually do any of the learning, i.e., they are a fixed, predefined operation that does not change as training progresses. Instead, they are used as the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m|<M} x[n + n', m + m', d]$$

where N=M=2.

When all the stages 502A, 502B are complete, a classification layer 512 is used to classify the image using the output of the final pooling layer 510B. As stated above, the classification layer 512 is actually a specialized convolutional layer containing a filter designed to produce the score from the volume output of the final pooling layer 510B. This filter applies a classification function having weights that may be refined in the same manner as the weights in the functions of the filters of the normal convolutional layers 504A, 504B.

Back propagation involves calculating a gradient of a loss function (defined later) in a loss layer 514, with respect to a number of weights in the DCNN 500. The gradient is then fed to a method that updates the weights for the next iteration of the training of the DCNN 500 in an attempt to minimize the loss function, which uses a different plurality of sample data (unless there is a need to repeat, such as running out of sample data). Back propagation uses the labeled sample data in a batch of sample data that have been passed through the stages 502A, 502B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 500 in order to generate the propagation's output activations (i.e., the images are passed through the stages 502A, 502B). Then, backward propagation of the propagation's output activations are performed through the DCNN 500 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 502A, 502B, are performed repeatedly until the error rate is below a particular threshold. An example of back propagation algorithms compatible with the DCNN 500 include, for example, gradient descent.

The use of the back propagation may be predicated on whether the combined error of the classification of the images in the batch of labeled sample data transgressed a preset error threshold. If the combined error is too great, then back propagation should occur to update and hopefully minimize the error for the next iteration, and a next iteration is performed with a subsequent batch of labeled sample data, until the combined error does not transgress the threshold.

As described above, the classification may be scored for the data. The DCNN 500 outputs a vector that may be compared to the desired output of some loss function, such as the sum square error function:

$$\text{loss} = \sum_i (\hat{l}_i - l_i)^2$$

Figure 6:
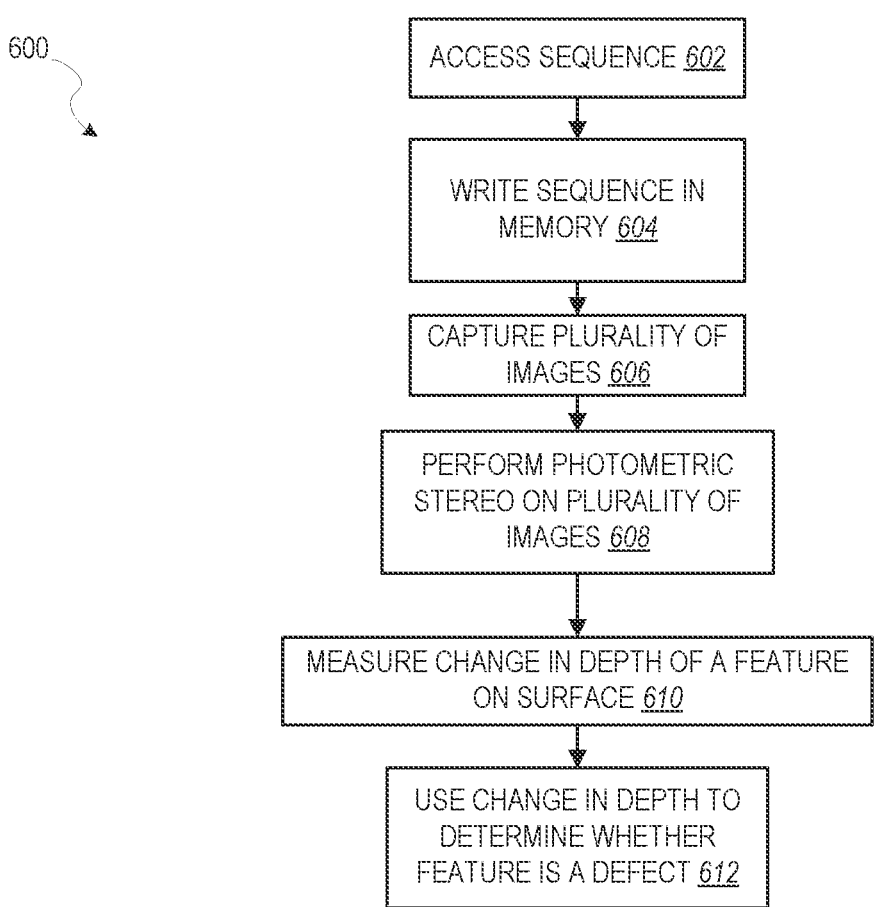
FIG. 6 is a diagram illustrating a method for performing 3D reconstruction, in accordance with an example embodiment.

FIG. 6 is a flow diagram illustrating a method 600 for performing 3D reconstruction, in accordance with an example embodiment. At operation 602 a sequence is accessed. The sequence comprises one or more capture configurations, each of the one or more capture configurations defining multiple image captures, each image capture having an exposure time and an indication of which single light source of the independently controllable light sources to light during a corresponding image capture process. At operation 604, the sequence is written in a memory accessible by the controller. At operation 606, a plurality of images, of a component, captured during execution of one of the one or more capture configurations of the sequence, are received from the controller. Each image is captured by the at least one camera of the lighting apparatus while the lighting apparatus lights the corresponding single light source.

At operation 608, a photometric stereo operation is performed on the plurality of images to create a three-dimensional (3D) reconstruction of the component. At operation 610, change in depth of a feature of a surface of the component in the 3D reconstruction is measured. At operation 612, the change in depth of the feature is used to determine whether the feature is a defect in the component.

Figure 7:
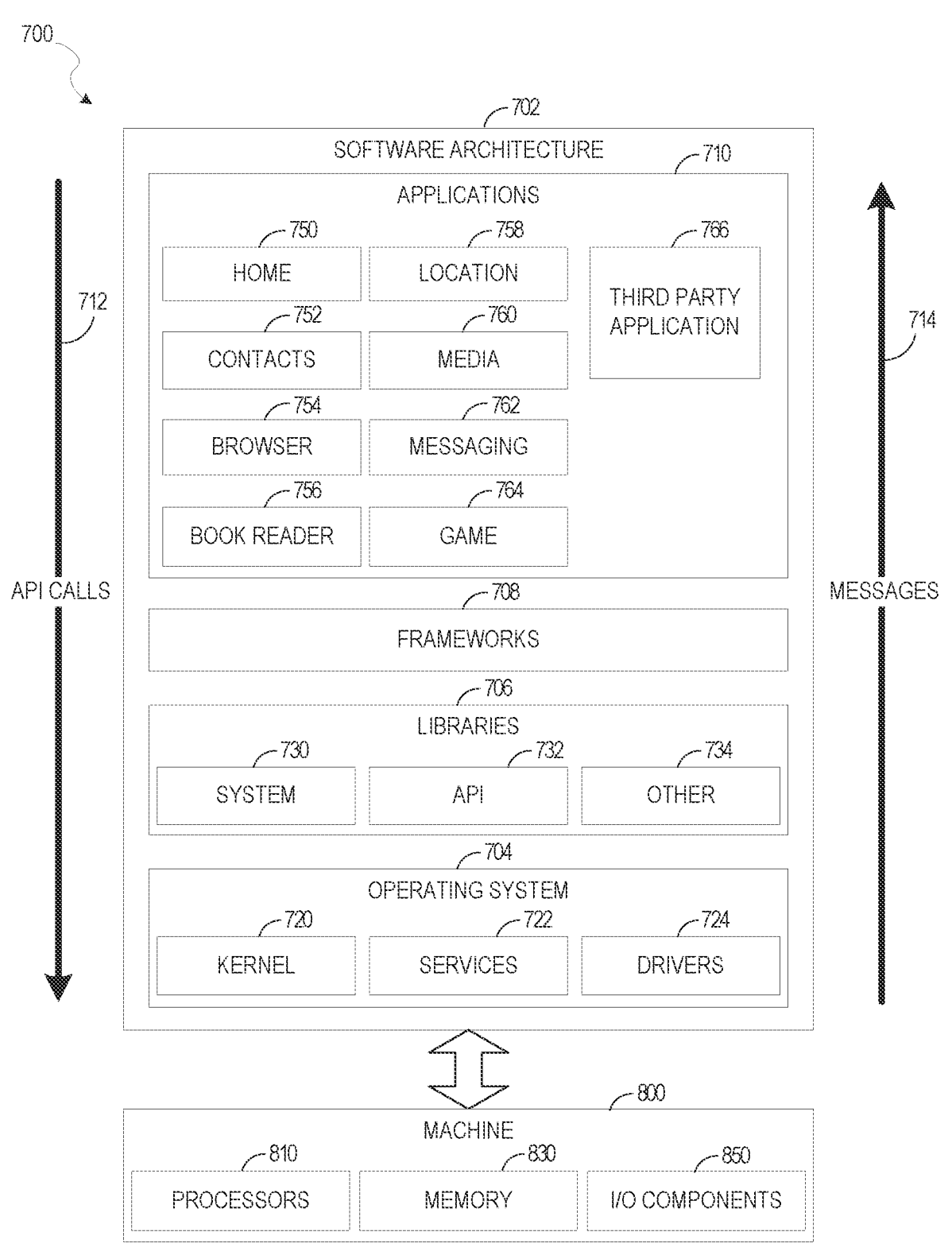
FIG. 7 is a block diagram illustrating a mobile device, according to an example embodiment.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710. For example, the frameworks 708 provide various graphical user interface functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. The applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 766 can invoke the API calls 712 provided by the operating system 704 to facilitate functionality described herein.

Figure 8:
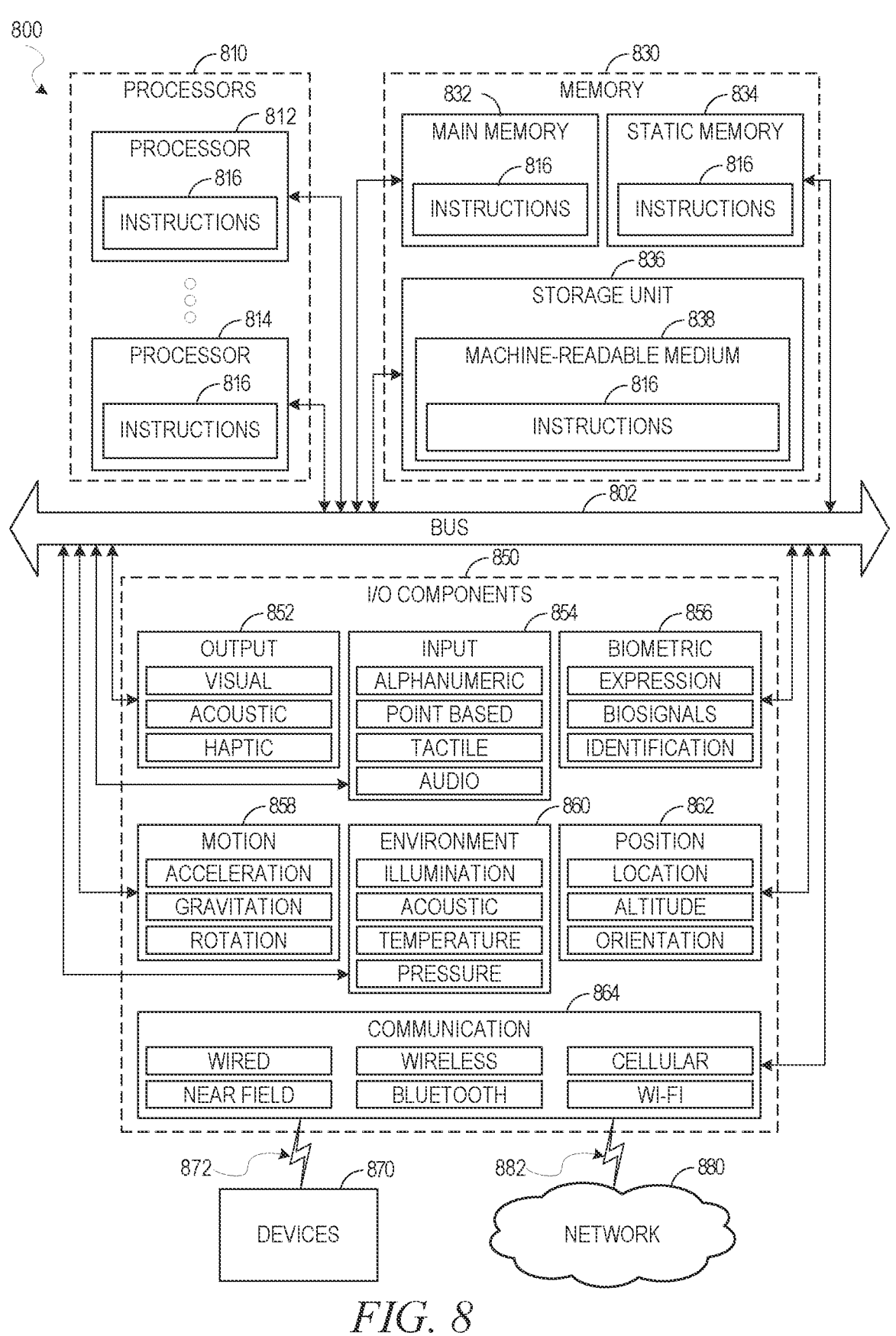
FIG. 8 is a block diagram of machine in the example form of a computer system within which instructions may be executed for causing the machine to perform any one or more of the methodologies discussed herein.

FIG. 8 illustrates a diagrammatic representation of a machine 800 in the form of a computer system within which a set of instructions may be executed for causing the machine 800 to perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) cause the machine 800 to perform any one or more of the methodologies discussed herein to be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:

a lighting apparatus including a plurality of independently controllable light sources and at least one camera; and a computer system comprising at least one hardware processor and a non-transitory computer-readable medium storing instructions that, when executed by the at least one hardware processor, cause the at least one hardware processor to perform operations comprising:

accessing a sequence of one or more capture configurations, each of the one or more capture configurations defining multiple image captures by the at least one camera, each image capture having an exposure time and an indication of which single light source of the independently controllable light sources to illuminate during the multiple image captures;

receiving a plurality of images, of a component, captured during execution of one of the one or more capture configurations of the sequence while the at least one camera remained in a fixed position relative to the component;

performing a photometric stereo operation on the plurality of images to create a three-dimensional (3D) reconstruction of the component;

measuring change in depth of a feature of a surface of the component in the 3D reconstruction; and based on the change in depth of the feature to determine whether the feature is a defect in the component.

2. The system of claim 1, wherein the measuring change in depth is performed using a Poisson distribution.

3. The system of claim 1, wherein the measuring change in depth is performed using a convolutional neural network trained to make a prediction of a classification of surface features.

4. The system of claim 3, wherein the convolutional neural network is trained by:

accessing a plurality of images from a first image data source, the plurality of images each having n number of color channels; and training the convolutional neural network using the plurality of images and a plurality of labels, each label corresponding to a classification.

5. The system of claim 1, wherein the plurality of images are captured sequentially by the camera while the component remains in a particular location.

6. The system of claim 1, wherein at least one of the one or more capture configurations is generated automatically using a technique where known specifications of a test component are used to select a grouping of the independently controllable lights.

7. The system of claim 6, wherein the technique includes:

testing a plurality of groupings of images, each grouping of images including a plurality of images each captured by the at least one camera of the lighting apparatus while the lighting apparatus lights a different single light source on a test component, the testing including performing the photometric stereo operation on each grouping of images to create a plurality of 3D reconstructions of the component, measuring changes in depth of a portion of a surface of the test component in the plurality of 3D reconstructions, and selecting the grouping of images whose change in depth measurement most closely matches the known specifications.

8. A method comprising:

accessing a sequence of one or more capture configurations, each of the one or more capture configurations defining multiple image captures by at least one camera, each image capture having an exposure time and an indication of which single light source of a plurality of independently controllable light sources to illuminate during the multiple image captures;

receiving a plurality of images, of a component, captured during execution of one of the one or more capture configurations of the sequence while the at least one camera remained in a fixed position relative to the component;

performing a photometric stereo operation on the plurality of images to create a three-dimensional (3D) reconstruction of the component;

measuring change in depth of a feature of a surface of the component in the 3D reconstruction; and based on the change in depth of the feature to determine whether the feature is a defect in the component.

9. The method of claim 8, wherein the measuring change in depth is performed using a Poisson distribution.

10. The method of claim 8, wherein the measuring change in depth is performed using a convolutional neural network trained to make a prediction of a classification of surface features.

11. The method of claim 10, wherein the convolutional neural network is trained by:

accessing a plurality of images from a first image data source, the plurality of images each having n number of color channels; and training the convolutional neural network using the plurality of images and a plurality of labels, each label corresponding to a classification.

12. The method of claim 8, wherein the plurality of images are captured sequentially by the camera while the component remains in a particular location.

13. The method of claim 8, wherein at least one of the one or more capture configurations is generated automatically using a technique where known specifications of a test component are used to select a grouping of the independently controllable lights.

14. The method of claim 13, wherein the technique includes:

testing a plurality of groupings of images, each grouping of images including a plurality of images each captured by the at least one camera of a lighting apparatus while the lighting apparatus lights a different single light source on a test component, the testing including performing the photometric stereo operation on each grouping of images to create a plurality of 3D reconstructions of the component, measuring changes in depth of a portion of a surface of the test component in the plurality of 3D reconstructions, and selecting the grouping of images whose change in depth measurement most closely matches the known specifications.

15. A non-transitory machine-readable storage medium having embodied thereon instructions executable by one or more machines to perform operations comprising:

accessing a sequence of one or more capture configurations, each of the one or more capture configurations defining multiple image captures by at least one camera, each image capture having an exposure time and an indication of which single light source of a plurality of independently controllable light sources to illuminate during the multiple image captures;

receiving a plurality of images, of a component, captured during execution of one of the one or more capture configurations of the sequence while the at least one camera remained in a fixed position relative to the component;

performing a photometric stereo operation on the plurality of images to create a three-dimensional (3D) reconstruction of the component;

measuring change in depth of a feature of a surface of the component in the 3D reconstruction; and based on the change in depth of the feature to determine whether the feature is a defect in the component.

16. The non-transitory machine-readable storage medium of claim 15, wherein the measuring change in depth is performed using a Poisson distribution.

17. The non-transitory machine-readable storage medium of claim 15, wherein the measuring change in depth is performed using a convolutional neural network trained to make a prediction of a classification of surface features.

18. The non-transitory machine-readable storage medium of claim 17, wherein the convolutional neural network is trained by:

accessing a plurality of images from a first image data source, the plurality of images each having n number of color channels; and training the convolutional neural network using the plurality of images and a plurality of labels, each label corresponding to a classification.

19. The non-transitory machine-readable storage medium of claim 15, wherein the plurality of images are captured sequentially by the camera while the component remains in a particular location.

20. The non-transitory machine-readable storage medium of claim 15, wherein at least one of the one or more capture configurations is generated automatically using a technique where known specifications of a test component are used to select a grouping of the independently controllable light sources.

* * * * *